United States Patent [19]
Fujioka

[11] Patent Number: 4,579,428
[45] Date of Patent: Apr. 1, 1986

[54] SMALL ZOOM LENS
[75] Inventor: Yoshisato Fujioka, Tokyo, Japan
[73] Assignee: Ricoh Company, Ltd., Japan
[21] Appl. No.: 604,428
[22] Filed: Apr. 30, 1984

Related U.S. Application Data
[63] Continuation of Ser. No. 244,733, Mar. 17, 1981, abandoned.

[30] Foreign Application Priority Data
Mar. 19, 1980 [JP] Japan .................. 55-35329

[51] Int. Cl.⁴ .................. G02B 9/64; G02B 13/04; G02B 15/14
[52] U.S. Cl. .................. 350/426
[58] Field of Search .................. 350/426

[56] References Cited
U.S. PATENT DOCUMENTS
4,323,302  4/1982  Kimura .................. 350/426

FOREIGN PATENT DOCUMENTS
083543 of 1976 Japan .
060246 of 1978 Japan .

*Primary Examiner*—John K. Corbin
*Assistant Examiner*—Rebecca D. Gass
*Attorney, Agent, or Firm*—Guy W. Shoup

[57] ABSTRACT

A small size zoom lens comprises a front and a rear group. The front group of lenses is of a diverging nature and includes three lenses disposed on an object side, while the rear group is of a converging nature and includes three lenses disposed on an image side. The lenses, from the object side, include a negative meniscus lens, having its convex surface directed toward the object side a negative lens having its concave surface directed toward the image side, a positive lens having its convex surface directed toward the object side, a positive lens, a positive meniscus lens having its convex surface directed toward the object side, a negative lens having its concave surface directed toward the image side, and a positive lens.

From the object side, the radius of curvature of an i-th lens surface is represented as $r_i$ ($i=1$ to 14), the j-th axial separation between the lens surfaces as $d_j$ ($j=1$ to 13), the refractive index of each lens with respect to the d-line of the spectrum by $n_1, n_2, \ldots n_7$, respectively, and focal length of the front group by $f_1$, the small size zoom lens satisfies the following requirements:

$$\frac{1}{r_3} > 0 \qquad (i)$$

$$0.5|f_1| < r_4 < |f_1| \qquad (ii)$$

$$0.8 < \frac{r_4 - d_4}{r_5} < 1.3 \qquad (iii)$$

$$0 < \frac{r_5}{r_6} < 0.7 \qquad (iv)$$

$$1.3 < \frac{r_7}{r_9} < 2.0 \qquad (v)$$

$$n_7 < 1.68 \qquad (vi)$$

2 Claims, 4 Drawing Figures

SMALL ZOOM LENS

This application is a continuation of application Ser. No. 244,733 filed Mar. 17, 1981 and now abandoned.

BACKGROUND OF THE INVENTION

The invention relates to a small size zoom lens.

A zoom lens is known in the prior art which comprises a pair of front diverging group of lenses and a rear converging group of lenses and in which the magnification is changed by varying the spacing between the front and the rear group. While this lens is advantageous for the construction of a zoom lens including a wide angle region because of its inverted telephoto type arrangement, it suffers from the disadvantages that distortion increases in the negative sense toward a shorter focal length in which the separation between the front and the rear group becomes greater and that a spherical aberration degrades toward the longer focal length where the front and the rear group come close to each other.

A zoom lens of this type including seven individual lenses is disclosed in Japanese Laid-Open patent application No. 083,543/1976, for example. The proposed zoom lens has an aperture ratio of 1:2.8 which affords a sufficient brightness, but leaves something to be improved in the spherical aberration and coma. The distortion at the maximum focal length is high, and on the order of about −5%. Another zoom lens is disclosed in Japanese Laid-Open patent application No. 060,246/1978, but cannot be defined as including a wide angle region inasmuch as the maximum angle of view at the minimum focal length is as low as 54 degrees. In addition, the aperture ratio at the greater focal length is relatively low i.e., in the order of 1:4.5, which is attributable to the difficulty of correction of the spherical aberration toward the longer focal lengths. This results in a reduced brightness.

SUMMARY OF THE INVENTION

It is an object of the invention to provide a small size room lens which utilizes a reduced number of individual lenses which is either seven or eight in number, and which achieves a favorable correction of the distortion at the minimum focal length and a very good correction of the spherical and other aberrations at the longer focal lengths.

The small size zoom lens according to the invention is characterized in that it is formed by a pair of front and a rear group of lenses. Referring to FIG. 1, a first lens $L_1$, a second lens $L_2$, a third lens $L_3$, a fourth lens $L_4$, a fifth lens $L_5$, a sixth lens $L_6$ and a seventh lens $L_7$ are disposed in the sequence named as viewed from the object side or from the left-hand side, as viewed in FIG. 1. The three lenses located nearer the object side form together the front group while the remaining four lenses form the rear group.

The first lens $L_1$ is a negative meniscus lens having its convex surface directed toward the object side. The second lens $L_2$ is a negative lens having its concave surface of a high curvature directed toward the image side. The third lens $L_3$ is a positive lens having its convex surface of a high curvature directed toward the object side.

The fourth lens $L_4$ is a positive lens, the fifth lens $L_5$ is a positive meniscus lens having its convex surface directed toward the object side, the sixth lens $L_6$ is a negative lens having its concave surface of a high curvature directed toward the image side, and the seventh lens $L_7$ is a positive lens.

The above description refers to a seven-lens arrangement in which the fourth lens $L_4$ is a positive single lens. An eight-lens arrangement is illustrated in FIG. 2 where the fourth lens $L'_4$ comprises a positive lens $L_{41}$ and a negative lens $L_{42}$ which is located on the image side of the lens $L_{41}$ and joined thereto.

The radius of curvature of the individual lens surfaces is successively referred to as $r_1, r_2, \ldots r_{14}$, beginning with the one which is located nearest the object side. The axial separation between the lens surfaces is successively referred to as $d_1, d_2, \ldots d_{13}$, again starting from the object side (see FIG. 1). In an eight-lens arrangement, the radius of curvature of the joining surface between the positive lens $L_{41}$ and the negative lens $L_{42}$ is referred to as $r'_7$, and the axial separation between the lens surfaces of the lenses $L_{41}$, $L_{42}$ is referred to as $d_{71}$, $d_{72}$, respectively (FIG. 2).

In addition, the refractive index of individual lenses with respect to the d-line of the spectrum is sequentially represented by $n_1, n_2, \ldots n_7$, again starting from the object side. Where the fourth lens comprises the positive single lens $L_4$, its refractive index is represented by $n_4$ while when a joined or composite lens system $L'_4$ is used, the refractive index of the lenses $L_{41}$, $L_{42}$ is represented by $n_{41}$ and $n_{42}$.

Based upon the above notations, the small size zoom lens of the invention must satisfy the following six requirements.

$$\frac{1}{r_3} > 0 \qquad (i)$$

$$0.5|f_1| < r_4 < |f_1| \qquad (ii)$$

$$0.8 < \frac{r_4 - d_4}{r_5} < 1.3 \qquad (iii)$$

$$0 < \frac{r_5}{r_6} < 0.7 \qquad (iv)$$

$$1.3 < \frac{r_7}{r_9} < 2.0 \qquad (v)$$

$$n_7 < 1.68 \qquad (vi)$$

DESCRIPTION OF EMBODIMENTS

Figure 1:
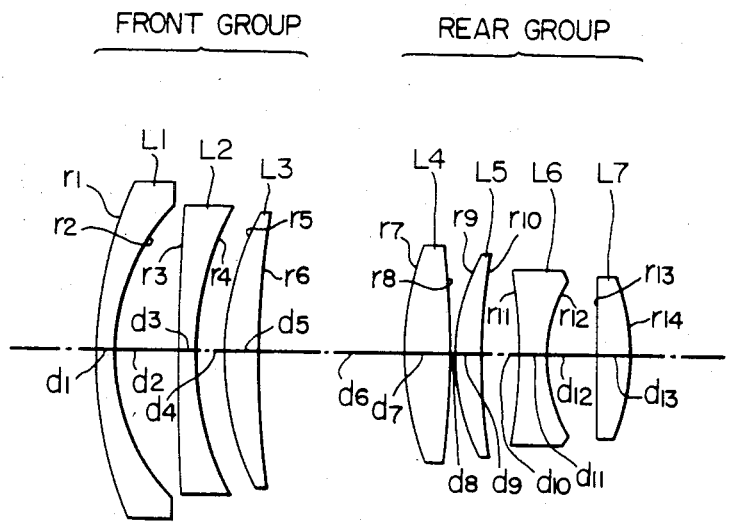
FIG. 1 is a schematic view of a seven-lens arrangement according to the invention.

The significance of the six requirements mentioned above will be described below. The requirement (i) or $1/r_3 > 0$ is provided to prevent an increase in the negative distortion toward the shorter focal length or increased angle of view and to maintain a good image field response. If this requirement is not met, or $1/r_3 \leq 0$, an appreciable curvature of image field toward the lens side occurs, which, if corrected by reducing the bending of a third lens $L_3$ toward the object side, would unfavorably increase the negative distortion.

The purpose of the second requirement (ii) is to maintain a proper distribution of the negative refractive power in the front group. If the value of $r_4$ is reduced below the limit, the front group will have a value of negative refractive power which is too strong. If the increased value of the negative refractive power is compensated for by a reduction in the negative refractive power of the first lens $L_1$, the image field will be curved significantly toward the lens side. An increase of the value of $r_4$ beyond its upper limit reduces the negative refractive power of the front group too much. If it is compensated by an increased value of the negative refractive power of the first lens $L_1$, there results in an unfavorable increase in the diverging coma.

The requirement (iii) achieves a configuration of an air lens, formed by the concave surface located on the image side of the second lens $L_2$ and the convex surface on the object side of the third lens $L_3$ under the requirement (ii), within a given range, thereby suppressing the coma and the spherical aberration, which tends to increase with an increasing value of the focal length, in a favorable range. If the lower limit is exceeded, there strongly appears a diverging coma and an overcorrection of the spherical aberration becomes remarkable. On the other hand, if the upper limit is exceeded, the converging coma increases while the spherical aberration tends to increase toward the undercorrection.

The requirement (iv) defines a relationship between the radius of curvature $r_5$ of the lens surface located on the object side of the third lens $L_3$ and the radius of curvature $r_6$ of the lens surface on the image side of the same lens under the condition of the requirements (ii) and (iii), and suppresses the various aberrations in a favorable range without increasing the negative distortion at the minimum focal length in connection with the requirement (i). If the lower limit is exceeded, the value of $r_6$ will increase to infinity or to a negative value. Specifically, the form of the third lens $L_3$ will be convex-flat or on both surfaces, causing a large variation in the distortion as the magnification is changed, thus increasing the negative distortion at the minimum focal length. If the upper limit is exceeded, the form of the third lens $L_3$ will be in the form of a position meniscus which exhibits a strong curvature toward the object side. While this is effective to provide a correction of the distortion, it unfavorably degrades the spherical aberration as a result of an increased non-sphericity for diverging light flux emerging from the negative lens of the first and the second lens $L_1$, $L_2$.

The requirement (v) defines a sharing of the refractive power between the object side lens surfaces of the fourth lens $L_4$ (or $L'_4$) and the fifth lens $L_5$ which represent the first and the second converging lens systems in the rear group, and is necessary in order to suppress the spherical aberration favorably and to transpose the location of the front principal point of the rear group toward the object side.

Since the front group is of a diverging nature in the lens arrangement of the invention, it is advantageous for the correction of the spherical aberration that the radius of curvature $r_7$ of the first surface located on the object side of the rear group has a negative value or a large positive value to bring it more close to an aplanatic configuration. However, if the value of $r_7$ is excessively large, the location of the front principal point of the rear group will shift toward the image side, resulting in an insufficient lens separation at the longer focal lengths where the front and rear groups come close to each other. If the value of the ratio $r_7/r_9$ increases beyond the upper limit of 2.0, the maximum focal length will be reduced, resulting in a reduced zoom ratio. Conversely, if the lower limit of 1.3 is exceeded, a degradation of the spherical aberration occurs for the reasons mentioned above.

The requirement (vi) is necessary to maintain a proper value of Petzval sum and to maintain a favorable image field response. If the value of $n_7$ increases beyond 1.68, the Petzval sum will be excessively small, rendering it difficult to balance the astigmatism and the curvature of the image field.

Figure 2:
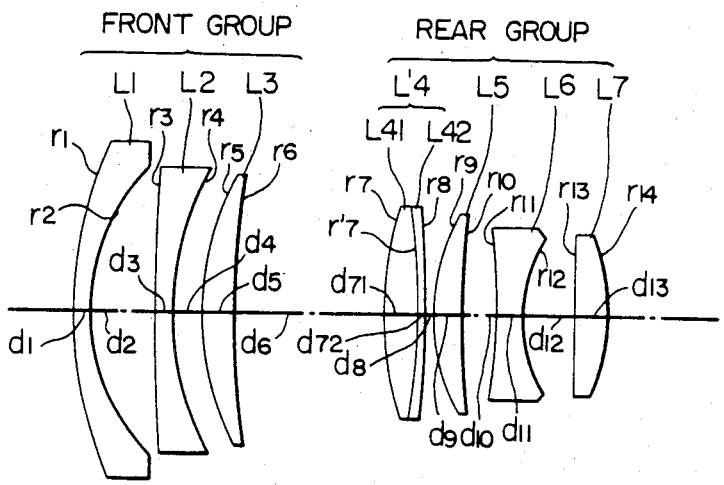
FIG. 2 is a schematic view of an eight-lens arrangement of the invention.

Considering now the difference between a seven-lens arrangement (FIG. 1) and an eight-lens arrangement (FIG. 2) for the small size zoom lens of the present invention, it has been mentioned previously that the fourth lens comprises a positive single lens $L_{14}$ in the seven-lens arrangement while it comprises a joined or composite system $L'_4$ including the positive lens $L_{41}$ and the negative lens $L_{42}$ in the eight-lens arrangement. The use of the positive single lens $L_4$ for the fourth lens provides an advantage that a small size room lens can be obtained with a reduced cost as compared with the use of the joined lens $L_4'$. On the other hand, the use of the joined lens $L_4'$ makes it possible to form it as an achromatic lens, which permits a change in the axial chromatic aberration to be minimized as the magnification is varied.

By way of example, two specific Examples will be described below, each for a seven- and an eight-lens arrangement. In the description of these Examples $v_1$, $v_2$, ... $v_7$ represent the Abbe's number of the first to the seventh lens, respectively. The notation $v_4$ represents the Abbe's number of the positive single lens $L_4$ while $v_{41}$, $v_{42}$ represent the Abbe's number of the lenses $L_{41}$, $L_{42}$ in the joined lens $L'_4$.

EXAMPLE 1

Aperture ratio 1:3.5
$f_1 = -67$
Focal length $f = 36 - 49.477 - 68$
Field angle: 63.8° −47.2° −35°

| | | | |
|---|---|---|---|
| $r_1 = 53.889$ | | | |
| | $d_1 = 2.2$ | $n_1 = 1.74950$, | $v_1 = 35.0$ |
| $r_2 = 25.690$ | | | |
| | $d_2 = 8.03$ | | |
| $r_3 = 313.691$ | | | |
| | $d_3 = 2.5$ | $n_2 = 1.69680$, | $v_2 = 55.5$ |
| $r_4 = 41.912$ | | | |
| | $d_4 = 3.58$ | | |
| $r_5 = 36.338$ | | | |
| | $d_5 = 3.85$ | $n_3 = 1.76180$, | $v_3 = 26.9$ |
| $r_6 = 96.561$ | | | |
| | $d_6 = 38.962 - 16.732 - 0.557$ | | |
| $r_7 = 41.575$ | | | |
| | $d_7 = 5.43$ | $n_4 = 1.69680$, | $v_4 = 55.5$ |
| $r_8 = -147.457$ | | | |
| | $d_8 = 0.2$ | | |
| $r_9 = 25.664$ | | | |
| | $d_9 = 4.1$ | $n_5 = 1.67790$, | $v_5 = 55.5$ |
| $r_{10} = 88.569$ | | | |
| | $d_{10} = 4.54$ | | |
| $r_{11} = -87.097$ | | | |
| | $d_{11} = 3.52$ | $n_6 = 1.78472$, | $v_6 = 25.7$ |
| $r_{12} = 20.811$ | | | |
| | $d_{12} = 6.29$ | | |
| $r_{13} = 178.809$ | | | |
| | $d_{13} = 4.01$ | $n_7 = 1.56732$, | $v_7 = 42.8$ |
| $r_{14} = -29.038$ | | | |

Figure 3:
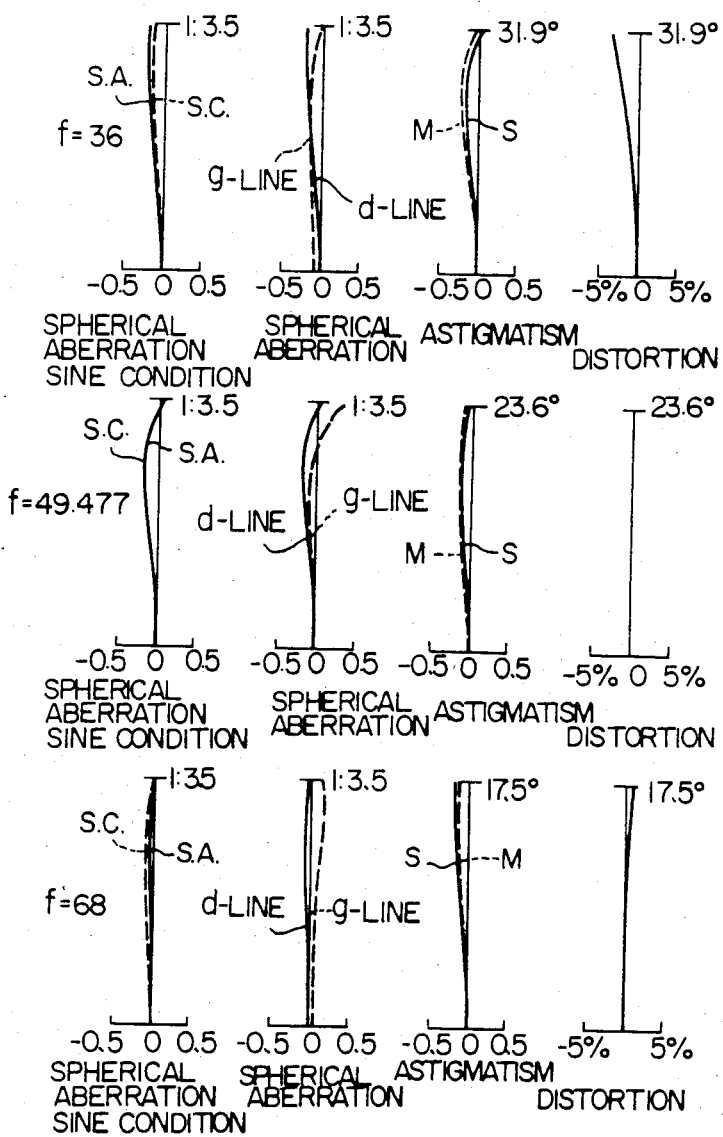
FIG. 3 graphically shows a series of curves representing various aberrations of the first embodiment.

The aberration curves of this Example are graphically illustrated in FIG. 3 for a minimum, an intermediate and a maximum value of the focal length f.

EXAMPLE 2

Aperture ratio 1:3.5
$f_1 = -67$
Focal length $f = 36 - 49.477 - 68$
Field angle: $63.8° - 47.2° - 35°$

| | | | |
|---|---|---|---|
| $r_1 = 54.394$ | | | |
| | $d_1 = 2.2$ | $n_1 = 1.74950,$ | $\nu_1 = 35.0$ |
| $r_2 = 25.901$ | | | |
| | $d_2 = 8.01$ | | |
| $r_3 = 305.774$ | | | |
| | $d_3 = 2.5$ | $n_2 = 1.69680,$ | $\nu_2 = 55.5$ |
| $r_4 = 40.949$ | | | |
| | $d_4 = 3.66$ | | |
| $r_5 = 36.350$ | | | |
| | $d_5 = 3.85$ | $n_3 = 1.76182,$ | $\nu_3 = 26.6$ |
| $r_6 = 98.974$ | | | |
| | $d_6 = 38.962 - 16.732 - 0.557$ | | |
| $r_7 = 41.399$ | | | |
| | $d_{71} = 4.45$ | $n_{41} = 1.69680,$ | $\nu_{41} = 55.5$ |
| $r'_7 = -82.687$ | | | |
| | $d_{72} = 1.1$ | $n_{42} = 1.72825,$ | $\nu_{41} = 28.3$ |
| $r_8 = -143.791$ | | | |
| | $d_8 = 0.2$ | | |
| $r_9 = 25.646$ | | | |
| | $d_9 = 3.97$ | $n_5 = 1.67790,$ | $\nu_5 = 55.5$ |
| $r_{10} = 87.287$ | | | |
| | $d_{10} = 4.46$ | | |
| $r_{11} = -86.306$ | | | |
| | $d_{11} = 3.43$ | $n_6 \; 1.74000,$ | $\nu_6 = 28.2$ |
| $r_{12} = 20.136$ | | | |
| | $d_{12} = 6.19$ | | |
| $r_{13} = 172.589$ | | | |
| | $d_{13} = 4.35$ | $n_7 = 1.53172,$ | $\nu_7 = 48.8$ |
| $r_{14} = -28.518$ | | | |

Figure 4:
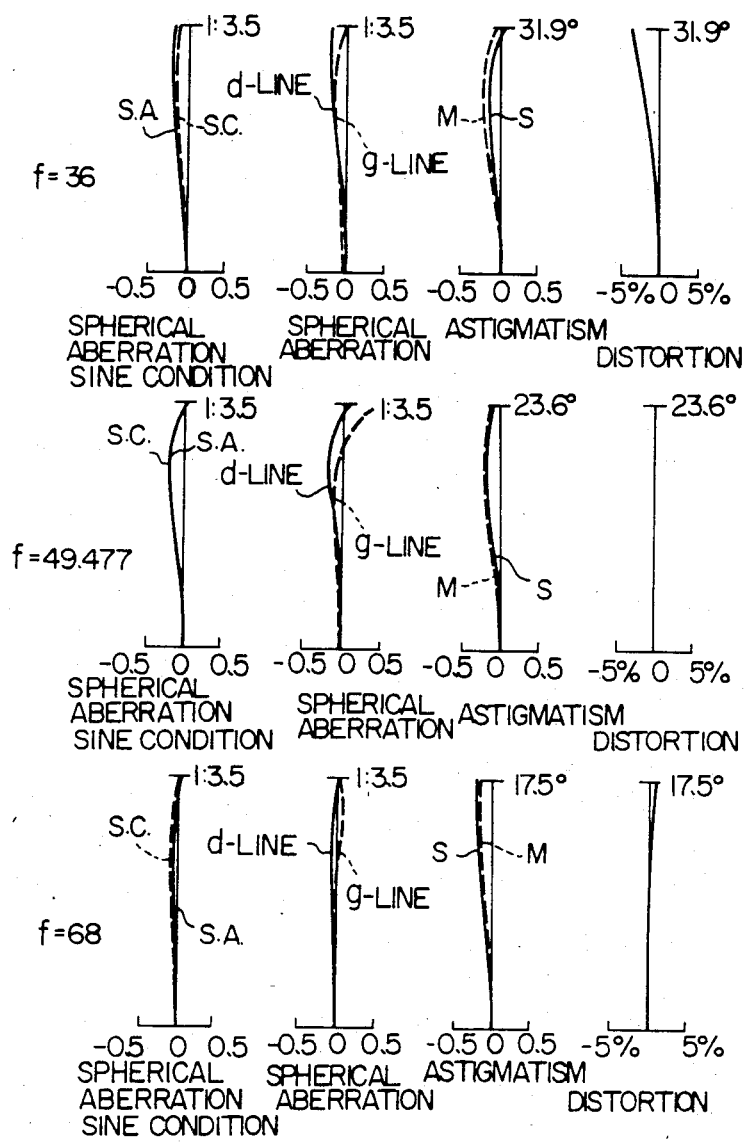
FIG. 4 graphically shows a series of curves representing various aberrations of the second embodiment.

The aberration curves of this Example are graphically shown in FIG. 4 for a minimum, an intermediate and a maximum value of the focal length f.

As will be evident from the aberration curves shown in FIGS. 3 and 4, the distortion is suppressed in a favorable manner at the minimum focal length while the value of the spherical aberration is very small at the maximum focal length. It will also be noted that the various aberrations are favorably corrected over the entire range of magnification, and that the distance from the front end of the first lens to the image field at the maximum focal length $f_{max}$ is as short as 1.68 $f_{max}$ in both Examples, providing a compact arrangement.

What is claimed is:

1. A small size zoom lens including a front, diverging group of lenses disposed toward an object side and a rear, converging groups of lenses disposed toward an image side and in which a magnification is varied by changing the separation between the front and the rear group; characterized in that the front group comprises a first lens formed by a negative mensicus lens having its convex surface directed toward the object side, a second lens formed by a negative lens having its concave surface of a high curvature directed toward the image side, and a third lens formed by a positive lens having a convex surface of a high curvature directed toward the object side, all arranged in the sequence named from the object side toward the image side, and the rear group comprises a fourth lens formed by a positive single lens, a fifth lens formed by a positive meniscus lens having its convex surface directed toward the object side, a sixth lens formed by a negative lens having its concave surface of a high curvature directed toward the image side, and a seventh lens formed by a positive lens, all disposed in the sequence named from the object side toward the image side, the first to the seventh lenses satisfying the following requirements:

$$\frac{1}{r_3} > 0 \quad \text{(i)}$$

$$0.5|f_1| < r_4 < |f_1| \quad \text{(ii)}$$

$$0.8 < \frac{r_4 - d_4}{r_5} < 1.3 \quad \text{(iii)}$$

$$0 < \frac{r_5}{r_6} < 0.7 \quad \text{(iv)}$$

$$1.3 < \frac{r_7}{r_9} < 2.0 \quad \text{(v)}$$

$$n_7 < 1.68 \quad \text{(vi)}$$

wherein $r_1, r_2, \ldots r_{14}$ represent the radius of curvature of each lens surface starting from the one located nearest the object side, $d_1, d_2, \ldots d_{13}$ the axial separation between adjacent lens surfaces again starting from the one nearest the object side, $n_1, n_2, \ldots n_7$ the refractive index of individual lenses with respect to the d-line of the spectrum, starting form the one located nearest the object side and $f_1$ represents the focal length of the front group, in which the Aperture ratio 1:3.5
$f_1 = -67$
Focal length $f = 36 - 49.477 - 68$
Field angle: $63.8° - 47\text{-}2° - 35°$

| | | | |
|---|---|---|---|
| $r_1 = 53.889$ | $d_1 = 2.2$ | $n_1 = 1.74950,$ | $\nu_1 = 3.50$ |
| $r_2 = 25.690$ | $d_2 = 8.03$ | | |
| $r_3 = 313.691$ | $d_3 = 2.5$ | $n_2 = 1.69680,$ | $\nu_2 = 55.5$ |
| $r_4 = 41.912$ | $d_4 = 3.58$ | | |
| $r_5 = 36.338$ | $d_5 = 3.85$ | $n_3 = 1.76180,$ | $\nu_3 = 26.9$ |
| $r_6 = 96.561$ | $d_6 = 38.962 - 16.732 - 0.557$ | | |
| $r_7 = 41.575$ | $d_7 = 5.43$ | $n_4 = 1.69680,$ | $\nu_4 = 55.5$ |
| $r_8 = -147.457$ | $d_8 = 0.2$ | | |
| $r_9 = 25.664$ | $d_9 = 4.1$ | $n_5 = 1.67790,$ | $\nu_5 = 55.5$ |
| $r_{10} = 88.569$ | $d_{10} = 4.54$ | | |
| $r_{11} = -87.097$ | $d_{11} = 3.52$ | $n_6 = 1.78472,$ | $\nu_6 = 25.7$ |
| $r_{12} = 20.811$ | $d_{12} = 6.29$ | | |
| $r_{13} = 178.809$ | $d_{13} = 4.01$ | $n_7 = 1.56732,$ | $\nu_7 = 42.8$ |
| $r_{14} = -29.038$ | | | | wherein $\nu_1, \nu_2, \ldots \nu_7$ represents the Abbe's number of the first to the seventh lens, respectively.

2. A small size zoom lens including a front, diverging group of lenses disposed toward an object side and a rear, converging group of lenses disposed toward an image side and in which a magnification is varied by changing the separation between the front and the rear group; characterized in that the front group comprises a first lens formed by a negative meniscus lens having its convex surface directed toward the object side, a second lens formed by a negative lens having its concave surface of a high curvature directed toward the image side, and a third lens formed by a positive lens having a convex surface of a high curvature directed toward the object side, all arranged in the sequence named from the object side toward the image side, and the rear group comprises a fourth lens formed by a positive single lens and a negative lens which is joined to the image side of the positive lens, a fifth lens formed by a positive meniscus lens having its convex surface directed toward the object side, a sixth lens formed by a negative lens having its concave surface of a high curvature directed toward the image side, and a seventh lens formed by a positive lens, all disposed in the sequence named from the object side toward the image side, the first to the seventh lenses satisfying the following requirements:

$$\frac{1}{r_3} > 0 \qquad (i)$$

$$0.5|f_1| < r_4 < |f_1| \qquad (ii)$$

$$0.8 < \frac{r_4 - d_4}{r_5} < 1.3 \qquad (iii)$$

$$0 < \frac{r_5}{r_6} < 0.7 \qquad (iv)$$

$$1.3 < \frac{r_7}{r_9} < 2.0 \qquad (v)$$

$$n_7 < 1.68 \qquad (vi)$$

wherein $r_1, r_2, \ldots r_{14}$ represents the radius of curvature of each lens surface starting from the one located nearest the object side, $d_1, d_2, \ldots d_{13}$ the axial separation between adjacent lens surfaces again starting from the one nearest the object side, $n_1, n_2, \ldots n_7$ the refractive index of individual lenses with respect to the d-line of the spectrum, starting from the one located nearest the object side and $f_1$ represents the focal length of the front group in which the

---

Aperture ratio is 1:3.5
$f_1 = -67$
Focal length $f = 36 - 49.477 - 68$

Field angle: 63.8° — 47.2° — 35°

| | | | |
|---|---|---|---|
| $r_1 = 54.394$ | | | |
| | $d_1 = 2.2$ | $n_1 = 1.74950$, | $v_1 = 35.0$ |
| $r_2 = 25.901$ | | | |
| | $d_2 = 8.01$ | | |
| $r_3 = 305.774$ | | | |
| | $d_3 = 2.5$ | $n_2 = 1.69680$, | $v_2 = 55.5$ |
| $r_4 = 40.949$ | | | |
| | $d_4 = 3.66$ | | |
| $r_5 = 36.350$ | | | |
| | $d_5 = 3.85$ | $n_3 = 1.76182$, | $v_3 = 26.6$ |
| $r_6 = 98.974$ | | | |
| | $d_6 = 38.962 - 16.732 - 0.557$ | | |
| $r_7 = 41.399$ | | | |
| | $d_{71} = 4.45$ | $n_{41} = 1.69680$, | $v_{42} = 55.5$ |
| $r'_7 = -82.687$ | | | |
| | $d_{72} = 1.1$ | $n_{42} = 1.72825$, | $v_{42} = 28.3$ |
| $r_8 = -143.791$ | | | |
| | $d_8 = 0.2$ | | |
| $r_9 = 25.646$ | | | |
| | $d_9 = 3.97$ | $n_5 = 1.67790$, | $v_5 = 55.5$ |
| $r_{10} = 87.287$ | | | |
| | $d_{10} = 4.46$ | | |
| $r_{11} = -86.306$ | | | |
| | $d_{11} = 3.43$ | $n_6 = 1.74000$, | $v_6 = 28.2$ |
| $r_{12} = 20.136$ | | | |
| $r_{13} = 172.589$ | | | |
| | $d_{13} = 4.43$ | $n_7 = 1.53172$, | $v_7 = 48.8$ |
| $r_{14} = 28.518$ | | | | wherein $v_1, v_2' \ldots v_7$ represents the Abbe's number of the first to the seventh lens, respectively, $v_{41}, v_{42}$; $n_{41}, n_{42}$; and $d_{71}, d_{72}$ represent the Abbe's number, the refractive index, and the axial separation between lens surfaces of the joined lenses in the fourth composite lens, and $r'_7$ represents the radius of curvature of the joined surface of the joined lenses.

* * * * *